United States Patent [19]

Tsubakiyama et al.

[11] Patent Number: 5,345,506
[45] Date of Patent: Sep. 6, 1994

[54] MUTUAL AUTHENTICATION/CIPHER KEY DISTRIBUTION SYSTEM

[75] Inventors: Hideki Tsubakiyama, Ohmiya; Masayoshi Oohashi, Kounosu; Keiichiro Koga, Kamifukuoka, all of Japan

[73] Assignee: Kokusai Denshin Denwa Kabushiki Kaisha, Tokyo, Japan

[21] Appl. No.: 70,730

[22] Filed: Jun. 2, 1993

[30] Foreign Application Priority Data

Jun. 11, 1992 [JP] Japan ................................. 4-175912

[51] Int. Cl.$^5$ ............................................. H04K 1/00
[52] U.S. Cl. ........................................ 380/23; 380/25; 380/30
[58] Field of Search ............................. 380/23, 25, 30

[56] References Cited

U.S. PATENT DOCUMENTS

| | | | |
|---|---|---|---|
| 4,816,655 | 3/1989 | Musyck et al. | 380/23 |
| 5,018,196 | 5/1991 | Takaragi et al. | 380/23 |
| 5,136,647 | 8/1992 | Haber et al. | 380/30 |
| 5,245,656 | 9/1993 | Loeb et al. | 380/23 |
| 5,249,230 | 9/1993 | Mihm | 380/30 |

*Primary Examiner*—David C. Cain
*Attorney, Agent, or Firm*—Emmanuel J. Lobato

[57] ABSTRACT

A communication network and its user i has a device for implementing a common key cryptosystem, an identifier of the user i represented by $ID_i$ which is made public in the network, an authentication key of a user i represented by $S_i$ is known only to the network and the user i and these identifiers and authentication keys of all the users are stored in a database of the network. Data for authentication and encrypted data of a cipher key for the subsequent privacy communication are sent from the network to the user, the user presents his identifier (ID) to the network, after which up to three interactions take place between the network and the user to perform the required authentications and distribution of the cipher key.

4 Claims, 4 Drawing Sheets

MUTUAL AUTHENTICATION/CIPHER KEY DISTRIBUTION SYSTEM

BACKGROUND OF THE INVENTION

The present invention relates to information or data security technology for communication networks and, more particularly, to a mutual authentication/cipher key distribution system which prevents abuse of the network in a personal mobile communication system.

The technology for information security of the system in the communication network is roughly divided into (a) a user authentication technique which prevents an unauthorized access to the network by making a check to see if a user is an authorized one, and (b) a cryptographic technique which conceals communication contents on the circuit being actually used, thereby preventing eavesdropping by a third party.

With respect to the authentication technique (a), CCITT has proposed, as an authentication technique for future personal communication technology, a system such as shown in FIG. 5, in which the network and all users employ identical encryption devices and the network authenticates the users individually without presenting or revealing their passwords or similar personal secret information on the circuit. Let the identifier of a user i and his authentication key be represented by $ID_i$ and $S_i$, respectively, and assume that $S_i$ is an authentication key known only to the network and the user. When the user i uses the network, he present first the information $ID_i$ to the network. Then the network generates a random number $r_u$ and sends it to the user i. The user i encrypts the random number $r_u$ with the encryption device using the authentication key $S_i$ as a secret key and sends the encrypted random number back to the network. Finally, the network fetches the authentication key of the user i held therein, similarly encrypts the random number $r_u$ using the fetched the authentication key as a secret key and, when the value of the thus encrypted random number matches with the value of the encrypted random number from the user i, authenticates the user i as an authorized user. This system requires a total of three interactions between the user and the network, including the presentation of the identification of the user to the network.

Besides, to prevent eavesdropping by the outsider (b), some key distribution system is used to implement key sharing between the network and the user. Finally, the shared key is used to encrypt correspondence and then communication starts between them.

As mentioned above in connection with the prior art, attention has been directed primarily to the function that the network authenticates the user. This is because the system has been designed on the understanding that the network is always correct or HONEST. In personal communication, however, since it is supposed that a base station, which covers a very narrow communication range, effects a position registration accompanying the communication with the user or his migration, there is a possibility that an abuser sets up a false base station and accesses the user via a radio channel. In such a situation the user will use his authentication key as a key to encrypt a proper numeral intentionally chosen by the false network and send it back thereto. This is what is called a chosen plaintext attack, which is the strongest one of various attacks on the cryptosystem. It is pointed out in a literature (E. Biham and A. Shamir: "Differential cryptanalysis of DES-1 like cryptosystems," '90 EUROCRYPTO, August 1990) that there is the likelihood that according to the choice of the cipher system, user's authentication key would be revealed by several rounds of such a chosen plaintext attack. Moreover, since a plurality of traders will provide personal communication services in the future, it will be necessary to make provision for enabling a user to correctly recognize the trader whose services are being used by the user.

Besides, the conventional system requires further interactions between the network and the user for the distribution of a key which is needed to hold cipher communication.

SUMMARY OF THE INVENTION

An object of the present invention is to provide a mutual authentication cipher key distribution system which obviates the above-mentioned defects of the prior art and which permits mutual authentication between the network and the user and afords reduction of the number of interactions between them for the distribution of the key needed for cipher communication.

The afore-mentioned problem could be solved through use of the novel methods of the present invention listed below.

In one aspect, the present invention proposes a mutual authentication/cipher key distribution system, in which a communication network and its user i has a device for implementing a common-key cryptosystem, identifier of user i represented by $ID_i$ which is made public in the network, and authentication key of user i represented by $S_i$ which is known only to the network and the user i, and which is characterized in that a prover decrypts an encrypted random number sent thereto from a verifier and uses the decrypted random number to encrypt a random number for authentication, sent from the verifier, and sends the encrypted random number back to the verifier, thereby making impossible a chosen plaintext attack on the encryption algorithm used.

In another aspect, the present invention proposes a mutual authentication/cipher key distribution system, in which a communication network its user i has a device for implementing a common-key cryptosystem, identifier of the user i represented by $ID_i$ which is made public in the network, and authentication key of user i represented by $S_i$ which is known to the network and the user i, and which is characterized in that a random number which is created by a verifier to authenticate a prover and sent to him and a random number which is created by the prover are processed by the prover using specific functions and the resulting values are encrypted by the prover and sent back to the verifier, thereby making impossible a chosen plaintext attack on the encryption algorithm used.

In another aspect, the present invention proposes a mutual authentication/cipher key distribution system, in which a communication network and its user i has a device for implementing a common key cryptosystem, identifier of the user i represented by $ID_i$ which is made public in the network, and authentication key of user i represented by $S_i$ which is known only to the network and the user i, and which is characterized in that a user first presents his identifier to the network by simultaneously sending thereto data for the authentication of the user by the network and data for the authentication of the network by the user and then up to three interactions take place between the user and the network to complete their mutual authentication.

In still another aspect, the present invention proposes a mutual authentication/cipher key distribution system, in which a communication network and its user has a device for implementing a common key cryptosystem, identifier of the user i represented by $ID_i$ which is made public in the network, and authentication key of user i represented by $S_i$ which is known only to of the network and the user i, and which is characterized in that a user first presents his identifier to the network by sending therefrom to the user data for authentication and encrypted data of a cipher key for the subsequent privacy communication and then up to three interactions take place between the network and the user to complete their mutual authentication and the distribution of the cipher key for cipher communication.

BRIEF DESCRIPTION OF THE DRAWINGS

The present invention will be described in detail below with reference to the accompanying drawings, in which.

PREFERED EMBODIMENTS

Embodiment 1

Figure 1:
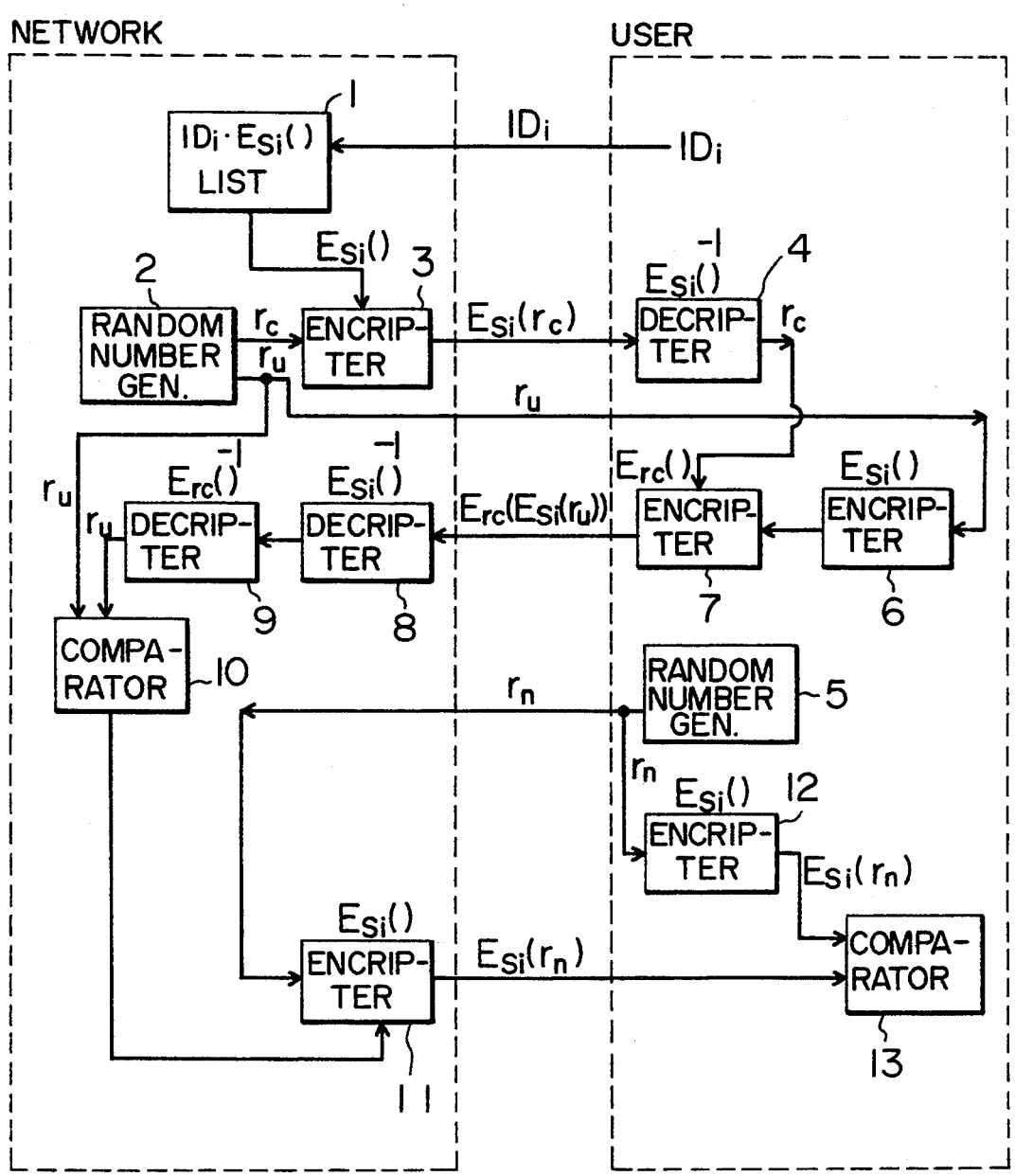
FIG. 1 is a block diagram illustrating a first embodiment of the present invention.
Figure 2:
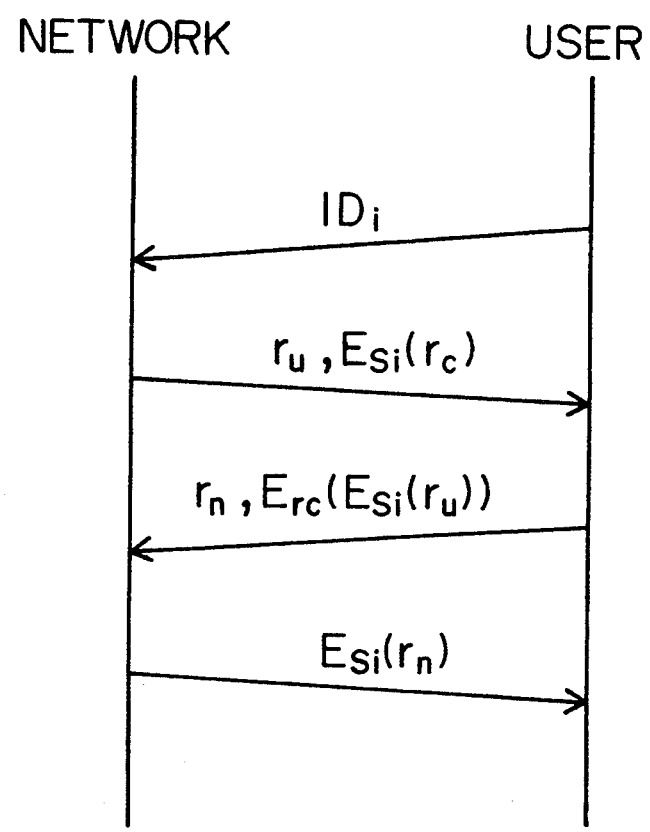
FIG. 2 is a flowchart showing the operation of the first embodiment of the invention.

Referring now to FIGS. 1 and 2, a first embodiment of the present invention will be described in detail. At first, the user i presents his identifier $ID_i$ to the network. Then the network generates, by a random number generator 2, a random number $r_u$ for the authentication of the user and a cryptographic key $k_c$ used for cipher communication between the network and the user i. After this, the network derives $Es_i()$ from a $ID_i$-$Es_i()$ list 1 on the basis of the identifier $ID_i$ of the user i and creates from an encryptor 3 an output $Es_i(r_c)$ encrypted by the authentication key $S_i$ of the user i and sends the random number $r_u$ and the output $Es_i(r_c)$ to the user i. In this case, only the user i who knows the authentication key $S_i$ is allowed to obtain the common key $r_c$ by a decryptor 4 from the output $Es_i(r_c)$, using a decrypting function $E^{-1}S_i()$. In response to this, the user i generates a random number $r_n$ for the authentication of the network, by a random number generator 5. Next, the user i creates, by an encryptor 6, the same cipher $Es_i()$ as that used by the network and uses it to encrypt the random number $r_u$ on the basis of the authentication key $S_i$, producing $Es_i(r_u)$. Furthermore, the user uses the common key $r_c$ to encrypt $Es_i(r_u)$ by an encryptor 7 into $Er_c(Es_i(r_u))$ and sends the random number $r_n$ and the encrypted output $Er_c(Es_i(r_u))$ to the network. Then the network computes $Er_c(Es_i(r_u))$ from the random number $r_u$, the common key $r_c$ and the authentication key $S_i$ of the user i which the network holds. When the value of $Er_c(Es_i(r_u))$ matches with the value sent from the user i, the network authenticates the user i as an authorized user. Alternatively, the network uses decrypting functions $Es_i()$ and $Er_c()$ of the authentication key $S_i$ and the common key $r_c$ to decrypt $Er_c(Es_i(r_u))$ from the user i by decryptors 8 and 9 to obtain the random number $r_u$ and compares it by a comparator 10 with the random number $r_u$ prepared by the network, and when the both random numbers match with each other, the user i is authenticated as an authorized user. If they do not match with each other, the network ends this session because the user has no valid authentication key $S_i$. Thereafter, the network creates $Es_i(r_n)$ by an encryptor 11 and sends it back to the user i recognized as a valid user. The user i computes, by the random number generator 5 and an encryptor 12, $Es_i(r_n)$ from the random number $r_n$ and the authentication $S_i$ that the user has. The user compares, by a comparator 13, the value of $Es_i(r_n)$ with that sent from the network. When they match with each other, the user authenticates the network as valid. Alternatively, the user decrypts $Es_i(r_n)$ to obtain the random number $r_n$, using the decrypting function $Es_i()$ of the authentication key $S_i$, and when this random number matches with the random number created by the user, the network is authenticated as valid. If the random numbers do not match with each other, then the network has no valid authentication key $S_i$ of the user in the database and thus the user judges that the network is invalid and then ends the session. In this way, three functions of (1) authenticating the user by the network, (2) authenticating the network by the user and (3) distributing the common key from the network to the user can be safely implemented by performing only one more interaction than in the conventional system, that is, simply by performing a total of four interactions including the presentation of the user's identifier to the network.

Embodiment 2

Next, a description will be given of a second embodiment which permits the implementation of all the three functions of (1) authenticating the user by the network, (2) authenticating the network by the user, and (3) distributing the common key from the network to the user, by performing a total of three interactions including the presentation of the user's identifier to the network as in the conventional system.

Figure 3:
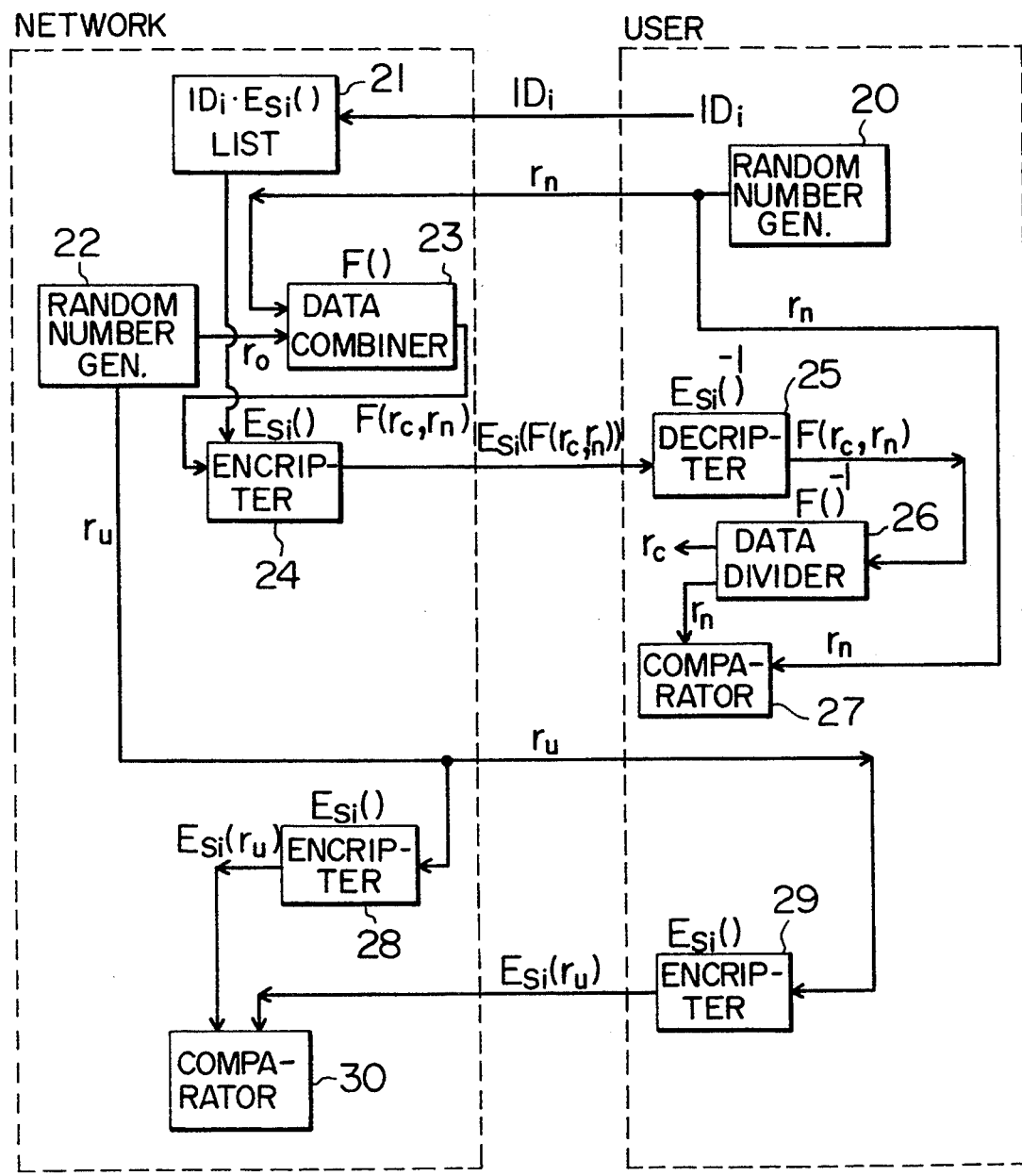
FIG. 3 is a block diagram illustrating a second embodiment of the present invention.
Figure 4:
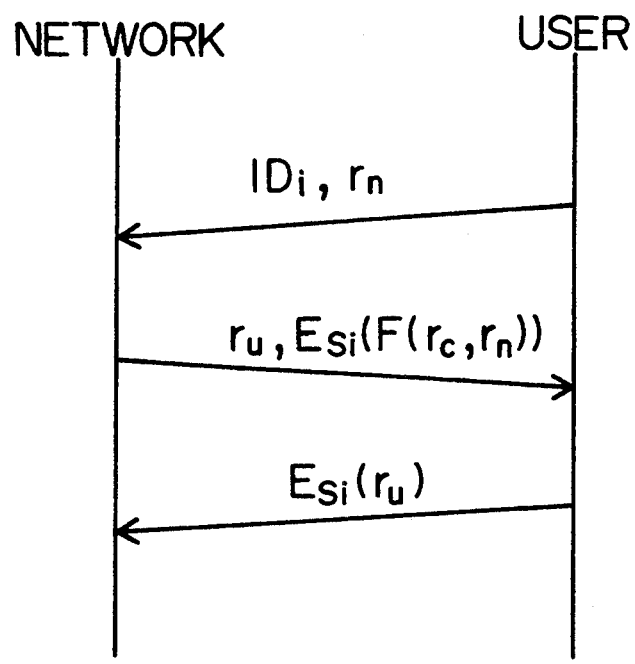
FIG. 4 is a flowchart showing the operation of the second embodiment of the invention.
Figure 5:
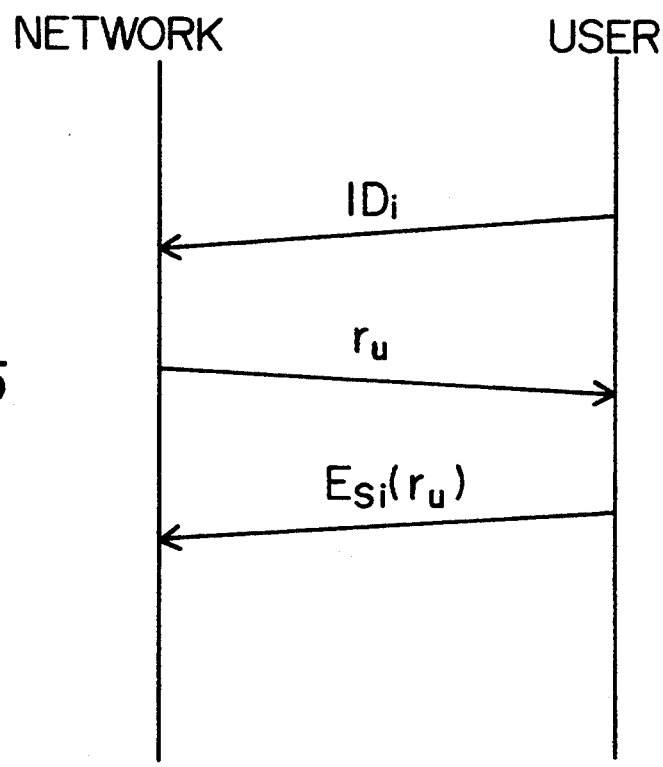
FIG. 5 is a flowchart showing the operation of a prior art example.

Turning now to FIGS. 3 and 4, a second embodiment of the present invention will be described in detail. At first, the user i generates the random number $r_n$ for the authentication of the network. The user i presents to the network his identifier $ID_i$ and the random number $r_n$ for authentication use generated by a random number generator 20. Then the network generates, by a random number generator 22, the random number $r_u$ for the authentication of the user and the cryptographic key $r_c$ which is used for the communication between the network and the user i. After this, the network derives $ES_i()$ from a $ID_i$-$ES_i()$ list 21 on the basis of the identifier $ID_i$ of the user i, and the network computes $Es_i(F(r_c, r_n))$ by an encryptor 24, using a function $F()$ in a data combiner 23 and the common key cipher function $Es_i()$ of the user i and sends $r_u$ and $Es_i(F(r_c, r_n))$ to the user i. The user i computes $E^{-1}s_i(Es_i(F(r_c, r_n)))$ to obtain $(r_c, r_n)$, using a decrypting function $E^{-1}s_i()$ of a decryptor 25 based on the authentication key $S_i$ of the user i and a function $F^{-1}()$ of a data divider 26 which is an inverse function $F()$, and $r_c$ is used as the cryptographic key for cipher communication between the network and the user. The random number $r_u$ for authentication use created by the user is compared by a comparator 27 with the random number $r_u$ obtained by decryption, and when they match with each other, the user authenticates the network as valid. If they do not match with each other, the network has no valid authentication $S_i$ of the user in the database and thus the user judges the network as invalid and ends the session. It is only the user i and the valid network that knows the decrypting function based on the authentication key $S_i$ of the user i. Hence $Es_i(r_c, r_n)$ appears to be a random number of unclear meaning to outsiders who do not know the function $F^{-1}s_i()$.

After this, the user i encrypts the random number $r_u$ by an encryptor 29 on the basis of the user's authentication key $S_i$ to obtain $Es_i(r_u)$, which is returned to the network. Then the network computes $Es_i(r_u)$ by an encryptor 28 from the random number $r_u$ and the user's authentication key $S_i$ both stored in the network. The value of $Es_i(r_u)$ is compared by a comparator 30 with the value of $Es_i(r_u)$ sent from the user i. When they match with each other, the user i is authenticated as a valid user. Alternatively, the network computes $E^{-1}(Es_i(r_u))$ from $Es_i(r_u)$ sent from the user i, using a decrypting function $E^{-1}s_i()$ based on the authentication key $S_i$ of the user i. When the thus computed value matched with the corresponding value sent to the user i, the network authenticates the user i as a valid user. If they do not match with each other, the user has no valid authentication key $S_i$ and hence the network ends this session. In this way, the three functions of (1) authenticating the user by the network, (2) authenticating the network by the user and (3) distributing the cryptographic key from the network to the user can all be implemented by performing up of three interactions between the network and the user, including the presentation of the user's identifier.

Incidentally, the function F() used in this embodiment needs to satisfy the "Conditions of the Function F()" listed below. "Conditions of the Function F()"

Condition 1: When x and y are determined, z which satisfies $z = F(x, y)$ needs to be determined uniquely.

Condition 2: When z is determined, x and y which satisfy $z = F(x, y)$ need to be determined uniquely.

Condition 3: When a certain x is given and a random r is used as a random variable, the probability of a fixed pattern is low in any part of a binary-expanded series of the output value $Es_i(F(x, y))$.

With the use of the present invention, it is possible not only to prevent an invalid user from abusing the network but also to prevent a false network from stealing key information from the user, and hence the invention is highly effective in improving the security of the system. In addition, the present invention make impossible a chosen plaintext attack on the encrypting functions used, and hence provides substantially increased system security. Moreover, the system of the present invention can be implemented by encryptors needed for the conventional common key cryptography, and although the number of interactions between the network and the user is exactly the same as in the prior art or larger by only one interaction, the distribution of the cryptographic key for cipher communication can also be done at the same time. Hence an extra burden on the system by the introduction of the present invention is so light that the invention will contribute greatly to the future network security.

What we claim is:

1. A mutual authentication/cipher key distribution system, wherein a combination network and all users belonging thereto have devices for implementing a common key cryptosystem, an identifier of a user i represented by $ID_i$ is made public in the network, an authentication key of a user i represented by $S_i$ is known only to the network and the user i, the identifiers and authentication keys of all the users are stored in a database of the network, and a prover decrypts an encrypted random number sent thereto from a verifier and uses the decrypted random number to encrypt a random number for authorization, sent from the verifier, and sends the encrypted random number back to the verifier, thereby making impossible a chosen plaintext attack on the encryption algorithm used.

2. A mutual authentication/cipher key distribution system, wherein a communication network and all users belonging thereto have devices for implementing a common key cryptosystem, an identifier of a user i represented by $ID_i$ is made public in the network, an authentication key of a user i represented by $S_i$ is known only to the network and the user i, the identifiers and authentication keys of all the users are stored in a database of the network, and a random number which is created by a verifier to authenticate a prover and sent to him and a random number which is created by the prover are processed by the prover using specific functions, and the resulting values are encrypted by the prover and sent back to the verifier, thereby making impossible a chosen plaintext attack on the encryption algorithm used.

3. A mutual authentication/cipher key distribution system, wherein a communication network and all users belonging thereto have devices for implementing a common key cryptosystem, an identifier of a user i represented by $ID_i$ is made public in the network;

an authentication key of the user i represented by $S_i$ is known only to the network and the user i, the identifiers and authentication key of all the users are stored in a database of the network, and a user first presents his identifier (ID) to the network by simultaneously sending thereto data for the authentication of the user by the network and data for the authentication of the network by the user and then up to three interactions take place between the network and the user to complete the authentication of the user by the network and the authentication of the network by the user.

4. A mutual authentication/cipher key distribution system, wherein a communication network and all users belonging thereto have devices for implementing a common key cryptosystem, an identifier of a user i represented by $ID_i$ is made public in the network, an authentication key of the user i represented by $S_i$ is known only to the network and to the user i, the identifiers and authentication key of all the users are stored in a database of the network, and a user presents his identifier (ID) to the network by sending therefrom to the user data for authentication and encrypted data of a cipher key for the subsequent privacy communication and then up to three interactions take place between the network and the user to complete the authentication and the distribution of the cipher key for cipher communication.

* * * * *